July 27, 1965
C. C. RICHMOND
3,196,902
FLOW CONTROL DEVICE
Filed Sept. 27, 1962
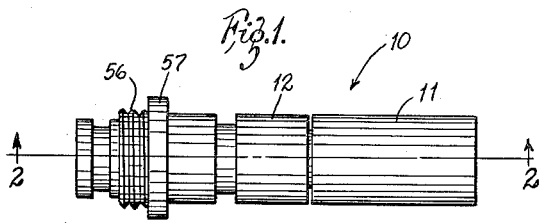
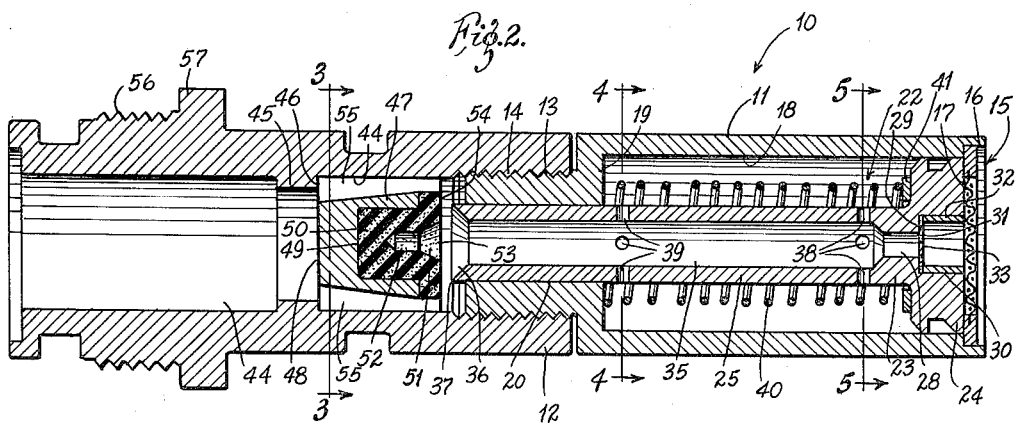
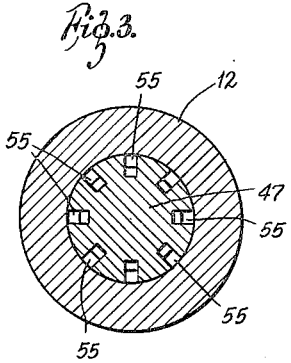 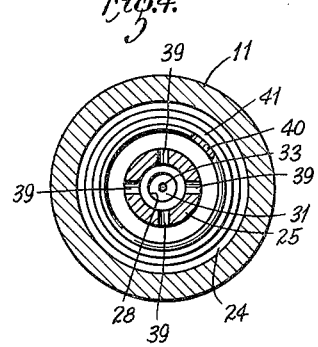 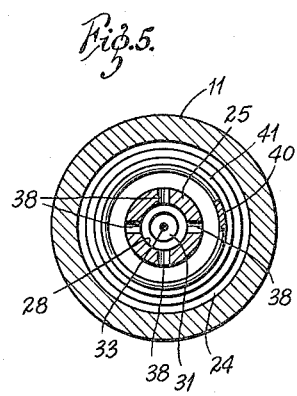
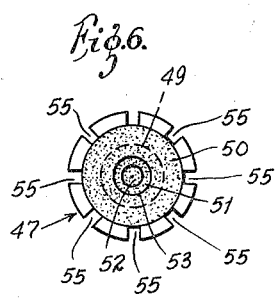
INVENTOR:
CHARLES C. RICHMOND,
BY Kingsland, Rogers, Ezell & Robbins
ATTORNEYS

United States Patent Office 3,196,902
Patented July 27, 1965

3,196,902
FLOW CONTROL DEVICE
Charles C. Richmond, St. Louis, Mo., assignor to Multiplex Company, St. Louis, Mo., a corporation of Missouri
Filed Sept. 27, 1962, Ser. No. 226,560
5 Claims. (Cl. 137—504)

This invention relates to a flow control device and particularly to a device for maintaining constant rates of flow of fluids regardless of the upstream and downstream pressure variations of the fluid, and if the fluid is liquid or finely ground powders, the control operates regardless of changes in the viscosity or molecular or surface friction.

Many flow control devices have been devised to maintain a relatively constant rate of flow in spite of pressure variations of the fluid, but to date no flow control operates effectively to maintain a constant rate of flow in spite of changes in the viscosity or molecular or surface friction of the fluid flowing through the control. The general object of this invention is to provide such a control.

In general, this invention comprises a housing having an inlet end and an outlet end with a valve seat positioned adjacent the outlet end and a slide movable toward and away from the valve seat to throttle the flow of fluid through the housing. Fluid flows through the slide member, and the inlet to the device opens to the interior of the slide member. At the inlet, there is a very thin orifice plate having a small orifice through it. Although there is some leakage past the slide member, more than 90% of the fluid flows through the orifice. A pressure differential is created between the upstream and downstream sides of the orifice plate, and variations in this pressure differential cause the slide member to throttle more or less with respect to the valve seat. Changes in this pressure differential are produced by the rate of flow of the fluid, but the pressure differential is not affected by changes in pressure of the fluid upstream of the device. Any such changes in pressure are felt by the upstream side of the orifice plate, but there is a corresponding change in pressure on the downstream side of the orifice plate thereby maintaining the constant pressure differential.

By making the orifice plate of very thin shim stock, the effect of variations in viscosity of the fluid upon the rate of flow of the fluid to the control device are substantially eliminated. Since the control device of the kind described herein may be used where temperatures of the fluid vary over a wide range and the viscosity of the fluid also varies, this feature is extremely important.

An important object of this invention is to provide a flow control for regulating the flow of fluids that has quick response to changes in flow conditions of the fluid.

Another object of the invention is to provide a flow control having means at the outlet from the control to stabilize the operation of the device. Specifically, an object is to provide a seal member at the outlet from the device with a recess in the seal member to reduce turbulence of the outgoing fluid, wherein the seal device is made of a resilient material to conform with irregularities in the downstream end of the slide member as it approaches the seal member.

Other objects and advantages will be apparent to those skilled in the art.

In the drawing:
FIGURE 1 is a side elevation view of the flow control;
FIGURE 2 is a view in section on an enlarged scale taken along the line 2—2 of FIGURE 1;
FIGURE 3 is a view in section taken along the line 3—3 of FIGURE 2;

FIGURE 4 is a view in section taken along the line 4—4 of FIGURE 2;
FIGURE 5 is a view in section taken along the line 5—5 of FIGURE 2; and
FIGURE 6 is an end view of the outlet plug as viewed from the upstream side of the plug.

Referring now to the drawing, the flow control 10 as illustrated in FIGURE 1, has the elongated shape that makes it particularly well suited for use with beverage dispensers. While beverage dispensers involve the flow of fluids and combinations of fluids and gases wherein there may be wide variations in pressure and viscosity of the fluid, thus evidencing the need for this control, the uses for the control are not limited to the beverage field. Accordingly, although the description of the invention may make reference to the beverage dispenser field, this flow control can be used wherever constant flow of fluids that vary in pressure and viscosity are desired. It follows that the shape of the control illustrated in FIGURE 1 is not critical and that, with the exception of certain relationships which will be described, the outward appearance of the control and the internal dimensions may be considerably varied.

The flow control has a housing including an inlet side 11 and an outlet side 12, one of which has external threads 13 and the other internal threads 14 to provide a fluid-tight connection between the two parts.

Referring to FIGURE 2, the flow control has an inlet 15 having a shallow enlargement 16 within which a screen 17 is press fitted. The screen 17 has a fine mesh for preventing all but the smallest particles of foreign matter from entering the flow control.

Inward of the inlet 15, the housing part 11 has a cylindrical inner wall 18 that ends at a wall or shoulder 19 opposite the threads 13. Beyond the wall 19, the housing part 11 has a cylindrical passage 20.

A sensor assembly 22 fits within the housing end 11. The sensor assembly includes a slide member 23 having a head 24 at the inlet end and an elongated tubular stem 25 extending toward the outlet end. The head 24 of the slide member 23 is guided by the cylindrical wall 18 of the housing end 11, but the fit is loose so that leakage can occur. Likewise, the stem 25 is guided by the cylindrical passage 20, but with a loose fit to permit leakage and freedom of movement.

Adjacent the inlet 15, there is a relatively small passage 28 joined at a shoulder 29 to a somewhat larger passage 30. The passage 30 communicates with the inlet 15. An orifice plate 31 is positioned against the shoulder 29 and is held in place by a retainer sleeve 32. The orifice plate 31 is very thin, preferably being made of 0.004 inch shim stock. It has a small orifice 33 through it.

There is a passage 35 communicating with the smaller passage 28 and extending to the outlet end 36 of the slide member 23. At this outlet end 36, the stem 25 is bevelled, countersunk or tapered to a knife edge 37. There are a plurality of holes 38 through the stem 25 adjacent the small passage 28 to connect the passage 35 with the space between the stem 25 and the housing wall 18. There are similar holes 39 through the stem 25 near the shoulder 19 of the housing end 11.

A compression spring 40 bears against the shoulder 19 at one end and at the other end against either the head 24 of the slide member 23 or against an adjusting washer 41. The washer 41 is used to adjust the force of the spring 40. The spring 40 biases the slide member 23 toward the inlet end 15 of the control.

The housing end 12 has a passage 44 through it and opening through the left end of the housing, as viewed in FIGURE 2. The wall of this passage 44 is interrupted by an inwardly extending annular stop 45 to provide a shoulder 46. An outlet plug 47 fits within the passage 44 with one end 48 bearing against the shoulder 46.

The outlet plug 47 has a countersunk recess 49 in it for receiving a rubber or plastic resilient seal 50. This seal 50 has a converging frusto-conical recess 51 that is bored deeper at its center 52. The mouth 53 of the recess is smaller in diameter than the diameter of the knife edge 47 on the opposing end of the stem 25, thereby providing a flat surface 54 surrounding the recess 51 which acts as a valve seat for the slide member 23.

There are a plurality of longitudinal grooves 55 around the outer side of the outlet plug 47. When the slide member stem 25 is not seated on the valve seat 54, these grooves 55 communicate the inner passage 35 of the valve stem 25 with the outlet passage 44, which opens to the left end of the housing.

The exterior of the housing end 12 may have threads 56 in combination with a shoulder 57 to provide a fitting allowing the flow control 10 to be connected to an external fluid conduit (not shown). The fitting illustrated in FIGURES 1 and 2 is one that allows the flow control to be used with a drink dispenser in which case the fluid passing through the flow control is a combination of syrup and carbonated or plain water or is syrup alone or is water alone.

In operation, fluid enters the inlet 15 and approaches the orifice plate 31 after passing through the screen 17. Although there is some leakage around the outer side of the head 24 of the slide member 23, approximately 90% or more of the fluid flows through the small orifice 33 of the orifice plate. This restricted flow produces a pressure drop and creates a pressure differential on opposite sides of the orifice plate with the greater pressure tending to urge the slide member 23 toward the valve seat 54. This movement of the slide member 23 is opposed by the compression spring 40.

On the initial flow of fluid into the flow control, there is some flow through the holes 38 and 39 into the space between the stem 25 and the housing wall 18. This flow expels air from inside the housing by forcing it past the outer side of the stem 25 on through the outlet. These holes 38 and 39 also equalize the fluid pressure on the inner and outer sides of the stem 25. Accordingly, there is a fluid pressure differential acting upon opposite sides of the head 24 of the slide member 23 with the higher pressure being on the inlet side and tending to move the slide member 23 in a throttling direction toward the valve seat 54.

Whenever the rate of flow through the flow control tends to increase, there is a greater pressure drop across the orifice 33 producing an increased net pressure differential tending to throttle the slide member 23. As the knife edge 37 moves closer to the valve seat 54, flow of fluid through the outlet groove 55 is restricted. This throttling of the fluid flow through the outlet causes a buildup of pressure upstream of the valve seat 54 tending to move the slide member 23 in an opening direction or to the right as viewed in FIGURE 2.

The various parts of the flow control that regulate the rate of flow of fluid can be adjusted so that any desired flow rate can be achieved. In the example illustrated for a flow control 10 used to maintain a constant rate of flow of syrup and carbonated water in a drink dispenser, the following dimensions have been found to be satisfactory.

One direct control over the flow rate is the size of the orifice 33 in the orifice plate 31. For a flow rate of 33 milliliters per 4 seconds, this orifice is about 0.052 inch. For a flow rate of 145 milliliters per 4 seconds, the size of the orifice is increased to about 0.067 inch. As already mentioned, the orifice plate 31 is about 0.004 inch thick. This thickness should be kept very small so that the flow control will maintain a constant rate of flow regardless of the viscosity of the fluid flowing through the control. Thus, even though the temperature of syrup may vary over a wide range and produce great variations in the viscosity of the syrup, and even though the pressure of the incoming fluid may vary over a wide range, the flow control maintains a constant flow rate.

The diameter of the passage 28 is not particularly critical although it is substantially larger than the diameter of the orifice 33. Likewise, the diameter of the passage 35 is not critical, and a suitable size is 3/16". Concerning the knife edge 37, it may be stated in general that the higher the flow rate, the sharper the knife edge. For a relatively low flow rate, the end of the knife edge is about 0.015 inch.

The size of the spring 40 can be changed. For a relatively low flow rate, a 0.028 inch spring having six active turns and two dead turns may be used, and for a higher flow rate, a 0.031 inch spring with the same number of turns is used. The washer 41 may be slipped onto the stem 25 to increase the force of the spring 40, thereby raising the flow rate through the control. The screw threads 13 and 14 allow fine adjustment of flow once the rough adjustment has been made with the washer.

The recess 51–52 in the outlet seal 50 reduces the turbulence of the fluid at the outlet and provides greater stability of control. Also, it has been found that the resilience of this seal 50 counteracts normal manufacturing irregularities of the downstream end of the slide member 23.

Various changes and modifications may be made within the purview of this invention as will be readily apparent to those skilled in the art. Such changes and modifications are within the scope and teaching of this invention as defined by the claims appended thereto.

What is claimed is:

1. A flow control device for regulating the flow of a liquid of variable viscosity and variable pressure comprising a housing having an inlet, an outlet, and a fluid chamber therebetween, a valve opening defined by a valve seat between the fluid chamber and the outlet, a slide movable toward and away from the valve seat to throttle the flow of liquid from the chamber to the outlet, means for biasing the slide member away from the valve seat, a passage through the slide member having an inlet end for receiving liquid introduced into the control, the end of the slide adjacent the valve seat being formed with an annular knife edge surrounding the passage, and means in the passage adjacent the inlet including an individual thin plate having an orifice through it for restricting the flow of liquid introduced into the inlet, means to position the thin plate within the passage, the wall defining the orifice being less than a few thousandths inch thick, the combination providing a substantially constant rate of fluid flow regardless of changes in viscosity and pressure of the fluid.

2. A fluid flow control device for regulating the flow of liquid of variable viscosity and variable flow rates comprising a housing having an inlet and an outlet, a slide in the housing movable toward and away from the outlet to throttle the flow of liquid through the outlet, the slide having a passage through it, the passage having an outlet end which communicates with the outlet and an inlet end which communicates with the inlet, a thin wall in the passage adjacent the inlet end, a small orifice through the thin wall, a valve seat between the slide and the outlet toward and away from which the slide moves, the valve seat being of resilient material and having a cavity in it opening toward the slide, the end of the slide which surrounds the outlet end of the passage being wholly outside the cavity, and means responsive to liquid pressure upstream and downstream of the thin wall to position the slide with respect to the valve seat to maintain a substantially constant rate of liquid flow through the outlet regardless of variations in viscosity of the liquid.

3. The fluid flow control device of claim 2 wherein the outlet is coaxial with the passage, and means defining a plurality of liquid passages surrounding the valve seat to provide liquid communication between the outlet and the liquid passage through the slide.

4. The device of claim 2 wherein the outlet end of the slide passage is defined by a knife edge.

5. The device of claim 4 wherein the valve seat has a planar face surrounding the cavity normal to the direction of movement of the slide.

References Cited by the Examiner

UNITED STATES PATENTS

| | | | |
|---|---|---|---|
| 2,025,545 | 12/35 | Muff | 138—44 |
| 2,044,806 | 6/36 | Naiman | 138—44 XR |
| 2,127,501 | 8/38 | Dall | 73—211 |
| 2,219,408 | 10/40 | Benz et al. | 137—505.25 XR |
| 2,698,027 | 12/54 | Branson | 137—504 XR |
| 2,698,029 | 12/54 | Branson | 137—504 XR |
| 2,872,939 | 2/59 | Terry | 137—504 |
| 2,888,949 | 6/59 | Evans | 251—333 XR |
| 2,967,543 | 1/61 | Viergutz | 137—504 |

FOREIGN PATENTS 288,716   11/15   Germany.

M. CARY NELSON, *Primary Examiner.*

MARTIN P. SCHWADRON, *Examiner.*